(No Model.)

W. A. MITCHELL.
CAR BRAKE.

No. 574,556. Patented Jan. 5, 1897.

Witnesses:
George A. Emery
Harold A. Wormwood

Inventor,
William A. Mitchell

UNITED STATES PATENT OFFICE.

WILLIAM A. MITCHELL, OF SACO, MAINE, ASSIGNOR OF ONE-HALF TO JASPER DUNCAN COCHRANE, OF SAME PLACE.

CAR-BRAKE.

SPECIFICATION forming part of Letters Patent No. 574,556, dated January 5, 1897.

Application filed June 15, 1896. Serial No. 595,516. (No model.)

*To all whom it may concern:*

Be it known that I, WILLIAM A. MITCHELL, a citizen of the United States of America, residing at Saco, in the county of York and State of Maine, have invented certain new and useful Improvements in Car-Brakes; and I do hereby declare the following to be a full, clear, and exact description of the invention, such as will enable others skilled in the art to which it appertains to make and use the same.

My invention relates to improvements in car-brakes, and especially to brakes adapted to be applied to electric-motor cars. In brakes as formerly constructed it has been nearly the uniform practice to apply the brake to the rim or periphery of the wheel. This has not always proved satisfactory from the fact that if there is any moisture on the track it makes the wheels slippery and prevents the brake from holding without the use of sand or grit, and when this is used it tends to wear away the rim of the wheels and flatten them, causing expense to the owners on account of their constant renewal. By my invention this wear of the rim of the wheel is lessened to a considerable degree, for I use means to prevent the revolution of the wheels without bearing directly upon the tires or rims themselves.

Figure 1:
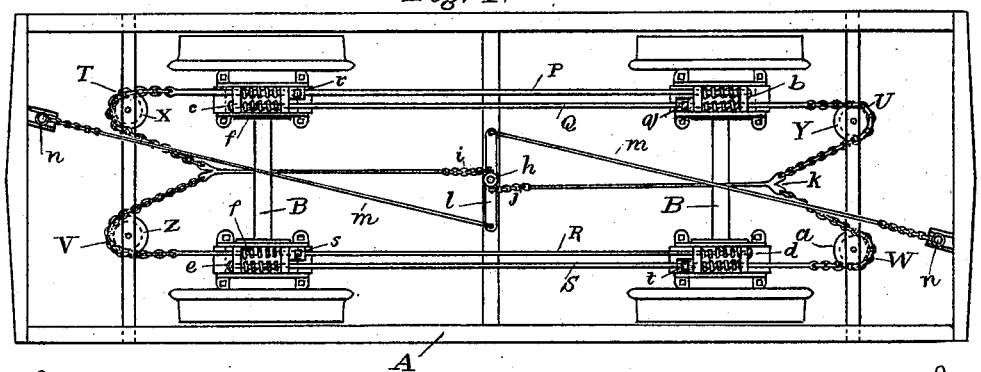
Figure 2:
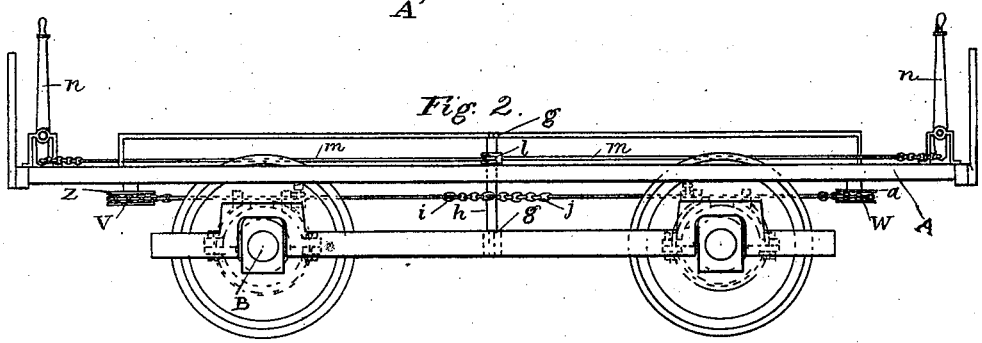
Figure 3:
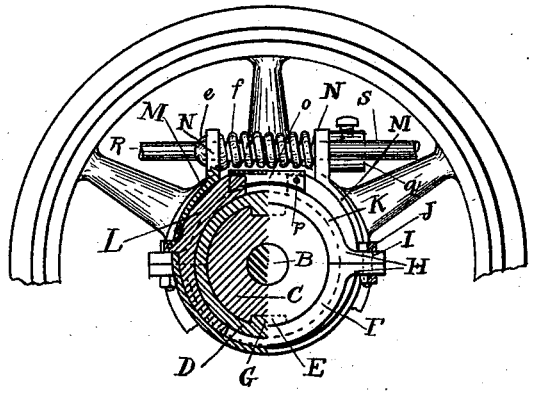

In the drawings herewith accompanying and forming a part of this application, Figure 1 is a plan view of the car, showing my improved brake and means for operating the same. Fig. 2 is an elevation of the car with my brake attached; and Fig. 3 is a detail, partly in section, showing means of fitting my improved brake to the wheel-hub.

Same letters refer to like parts.

In said drawings, A represents a car-frame, and B the axle thereof. Attached to or made integral with the inner hubs of the wheels C are shoulders D, which are provided with sockets E in their peripheries. Adapted to be removably attached to said shoulder are two semicircular collars F, provided with lugs G, adapted to fit into the sockets E in the enlarged and extended hub of the wheel. These semicircular collars are also provided with ears H, in which are sockets I, adapted to register with each other and to receive a bolt J for holding them firmly in position. Said collars have also a flange K. Surrounding said collars and adapted to fit within the flange are split brake-shoes L, and surrounding said split brake-shoes is a spring-band M, which is loosely attached to said split brake-shoes and which normally tends to hold the same away from the semicircular collars. Said spring-bands M are provided with ears N at their upper extremities. Running through suitable sockets in said ears are rods P Q R S. Attached to one end of each of the said rods are chains T U V W, which are adapted to run over sheaves X Y Z $a$, pivotally attached to the car-frame, and to the other end of said rods are attached nuts $b\ c\ d\ e$, which serve as a stop to prevent the rods from pulling through the sockets in the ears of the band-springs when power is applied thereto. There are also adjusting-nuts $q\ r\ s\ t$, which are used to adjust the rods P Q R S and to take up the wear that comes upon the brake-shoes from constant use. Surrounding said rods between the ears on the spring-band are coil-springs $f$, which tend, when pressure on the rods has been released, to augment the power of the spring-bands and to make more certain that they will be thrown back to their normal position, thereby releasing the brakes.

Pivotally attached to the bottom of the car by means of a bracket $g$, suspended from the bottom of the car or by other suitable means, is a shaft $h$. Rigidly attached on opposite parts of the circumference of said shaft $h$ and running to each end of the car-frame are connecting rods and chains $i$ and $j$, which are attached to the chains T U V W by means of a yoke $k$. Rigidly attached to said shaft near the top thereof is a yoke $l$. Said yoke is fitted to said shaft $h$, so as not to rotate thereon. Running through each end of the yoke to each end of the car are brake-chains $m$, which connect with the ordinary brake-lever $n$ at each end of the car.

When the motorneer wishes to apply the brakes, he pulls toward himself the handle $n$, thereby shortening the brake-chains $m$ and causing the shaft to rotate. By rotating said shaft the chains connected therewith are tightened by being wound upon said shaft, causing also the chains T U V W to move over the sheaves X Y Z $a$, consequently drawing the rods outwardly and thereby bringing the spring-bands together, forcing the brake-shoes upon the collar and preventing the wheel thereby from revolving. When pressure is released, the force of the spring-band and the spring confined between the ears thereof will release the brake and allow the wheels to revolve again.

In order to prevent dust from getting in between the brake-shoe and the removable collar, I fit a small dust guard or cap *o* over the split brake-shoe and between the flange on the removable collar by attaching the same to one of the brake-shoes by means of a pin *p*. This in no way interferes with the working of the brake, for it simply slides over the split brake-shoes when the two parts are brought together and prevents small particles of dust or gravel from getting between the split brake-shoes and also between the brake-shoes and collars, thus preventing a too rapid wearing away of the contiguous parts.

Band-brakes I am aware have been used on other machines, especially on derricks and hoisting-machines, but in these one of the ends has always been rigid, the braking being accomplished by the free end of the spring-band. In my improved brake it will be seen that both ends of the spring move and an equal pressure is brought to bear on all sides of the collar at the same time.

The advantages of my improved brake are that it can be easily applied and acts very quickly, it requiring but a quarter-turn of the vertical shaft to apply the brakes so firmly that the wheels will be prevented from revolving.

Having thus described my invention and its use, I claim—

1. In a car-brake in combination, wheels provided with an enlarged inner hub having sockets in the periphery thereof, semicircular collars provided with lugs on their inner periphery surrounding said hub and adapted to be rigidly attached thereto, split brake-shoes adapted normally to loosely fit over said collars, a curved band-spring attached to said brake-shoes and means for tightening and loosening said band-spring, substantially as and for the purposes set forth.

2. In a car-brake in combination, wheels, semicircular collars rigidly attached thereto, a spring-band provided with split brake-shoes adapted normally to fit loosely over said collars, said band-spring being provided with ears containing sockets through which are adapted to run rods to tighten said band-spring, substantially as and for the purposes set forth.

3. In a car-brake, in combination, wheels provided with enlarged inner hubs, split brake-shoes adapted to surround the inner hub of said trucks and held in position by means of curved band-springs provided with ears, rods having an adjusting-nut on one end running through said ears, pulleys attached to the bottom of the car, and chains running from the end of the rods over said pulley to a vertical shaft pivotally attached to the bottom of the car-frame near its center, a yoke rigidly attached to said vertical shaft, and chains running from the arms of said yoke to the ends of the car, substantially as and for the purposes set forth.

In testimony whereof I affix my signature, in presence of two witnesses, this 25th day of May, A. D. 1896.

WILLIAM A. MITCHELL.

Witnesses:
GEORGE A. EMERY,
HAROLD A. WORMWOOD.